Figure 2:
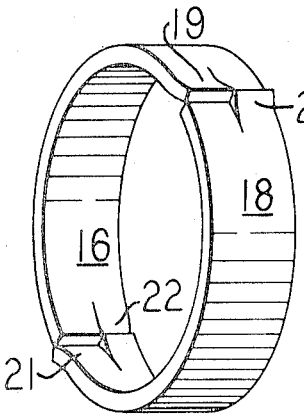
Figure 1:
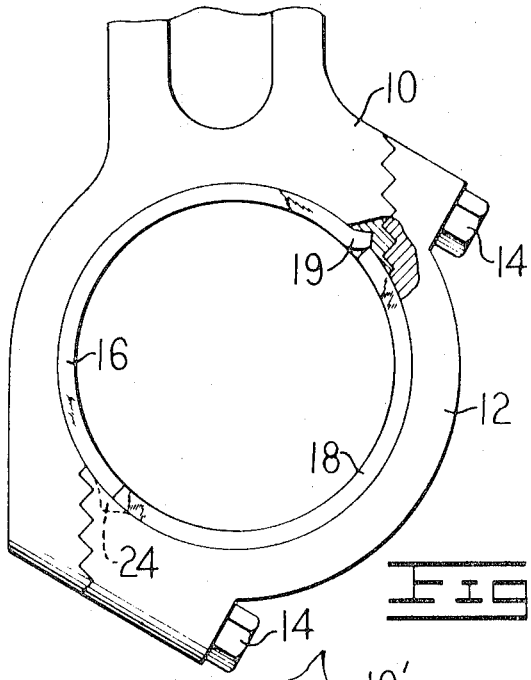
Figure 4:
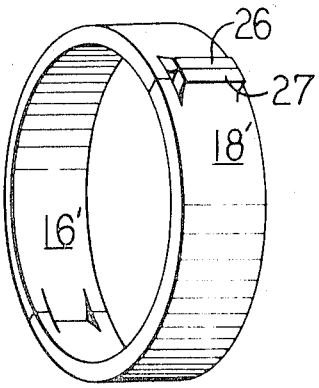
Figure 3:
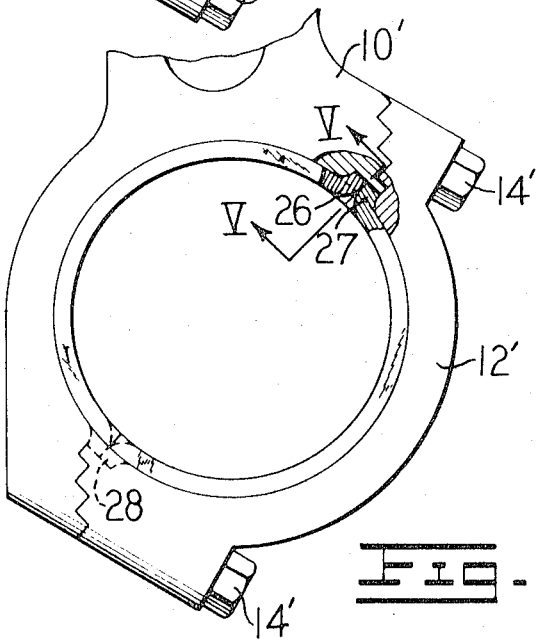
Figure 5:
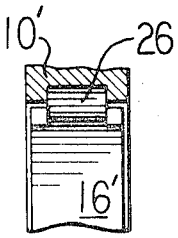

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 404

T893,014

BEARING INSERT RETAINING MEANS

Almond J. Gatzemeyer, 10423 N. Forrest Trail, Peoria, Ill. 61614, and George B. Grim, 710 Crestview Drive, Washington, Ill. 61571

Filed Mar. 16, 1971, Ser. No. 124,713
**Int. Cl. F16c *9/00***
U.S. Cl. 308—237
1 Sheet Drawing. 5 Pages Specification

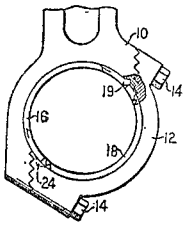

Bearing inserts for connecting rods and the like have a substantially semi-circular configuration and are adapted to be inserted in paired relationship within a connecting rod and cap bore with a radially loose or floating fit to allow radial self-adjustment of the bearing inserts for oil film clearance and resultant journal bearing effects.

The bearing inserts are restrained against axial movement out of the rod bore and against rotational movement, preventing loading of the bearing joints and backs, and allowing bearing designs oriented to load patterns, by means of restraining tabs extending radially outwardly into appropriate notches in the rod and cap bores.

The tabs are provided by segments of the ends of the bearing inserts which are bent outwardly from the surface of the bearing. The notches in the connecting rod and cap loosely receive the tabs and prevent them and the bearing inserts from moving axially or rotating.

Dec. 14, 1971 A. J. GATZEMEYER ET AL T893,014

BEARING INSERT RETAINING MEANS

Filed March 16, 1971

INVENTORS
ALMOND J. GATZEMEYER
GEORGE B. GRIM

BY
Fryer, Tjensvold, Feix, Phillips & Lempio
ATTORNEYS